July 13, 1965 — S. COHAN — 3,194,515
JET AIRCRAFT STRUCTURE FOR ENGINE REMOVAL
Filed Dec. 6, 1963 — 2 Sheets-Sheet 1
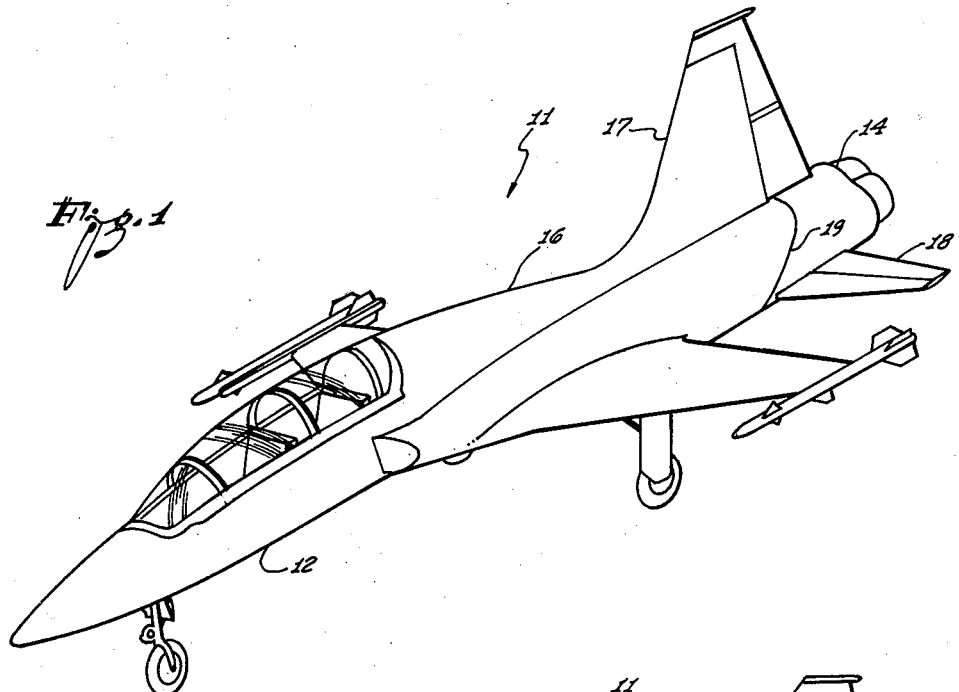
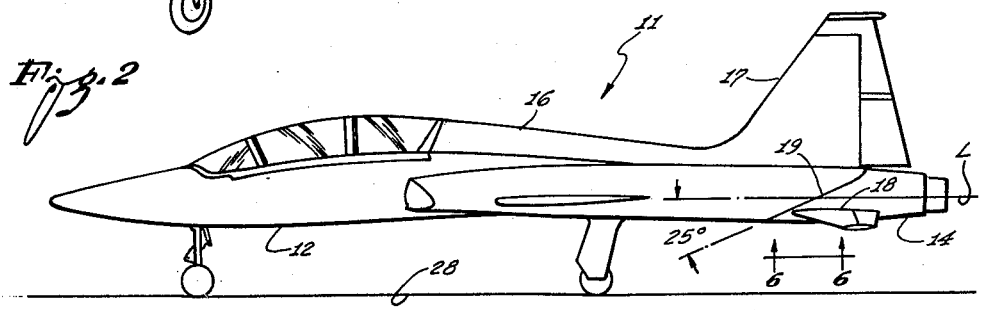
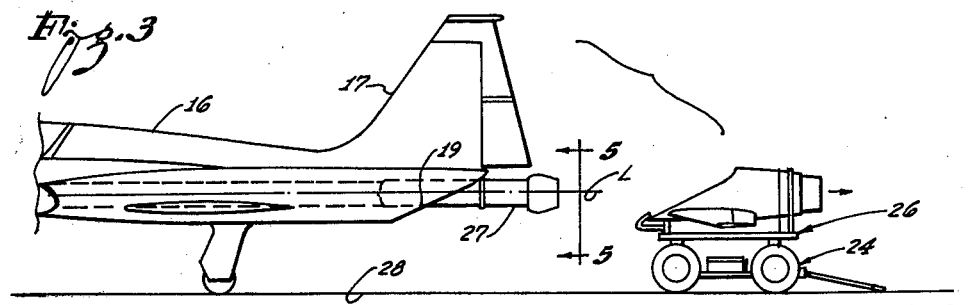
INVENTOR:
Sidney Cohan
Willard M. Graham
Agent July 13, 1965 S. COHAN 3,194,515
JET AIRCRAFT STRUCTURE FOR ENGINE REMOVAL
Filed Dec. 6, 1963 2 Sheets-Sheet 2

INVENTOR:
Sidney Cohan

By Willard M Graham
Agent

United States Patent Office 3,194,515
Patented July 13, 1965

3,194,515
JET AIRCRAFT STRUCTURE FOR ENGINE
REMOVAL
Sidney Cohan, Inglewood, Calif., assignor to Northrop
Corporation, Beverly Hills, Calif., a corporation of
California
Filed Dec. 6, 1963, Ser. No. 328,583
3 Claims. (Cl. 244—54)

This invention relates to aircraft structures and more particularly to the construction and arrangement of the fuselage of a jet-powered aircraft making possible ready accessibility and easy removal of the aircraft engine or engines.

Periodically it becomes necessary to service the power plant of a jet powered aircraft and also to exchange the engine or engines thereof. Accordingly, the importance of constructing the aircraft in a manner providing ready access to the aircraft's engines, also in a manner enabling the engine or engines thereof to be quickly and easily removed and replaced, becomes apparent.

The fuselage of the aircraft as disclosed herein includes fore, aft and center sections. The aft and center sections are joined together along a plane having a canted relation with respect to the longitudinal axis of the aircraft. Thus, at such times as the aft section is removed from the center section, major portions of the aircraft's engine or engines are rendered accessible for repair or general maintenance. Also included in the fuselage is track means making possible quick and easy removal and replacement of the aircraft's engine or engines. These and other features of the invention will become apparent as the disclosure progresses.

Accordingly it is an object of this invention to provide a jet powered aircraft, components of which are constructed and arranged in a manner providing ready access to the aircraft's power plant.

Another object is to provide a jet powered aircraft the fuselage of which includes track means facilitating the removal and replacement of the power plant thereof.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a perspective view of a jet powered aircraft incorporating the construction as disclosed herein.

FIGURE 2 is a side elevational view of the aircraft shown in FIGURE 1.

FIGURE 3 is a fragmentary side elevational view of the aft end of the aircraft shown in FIGURE 2, in this figure the aft fuselage section is shown as being separated from center section.

Figure 4:
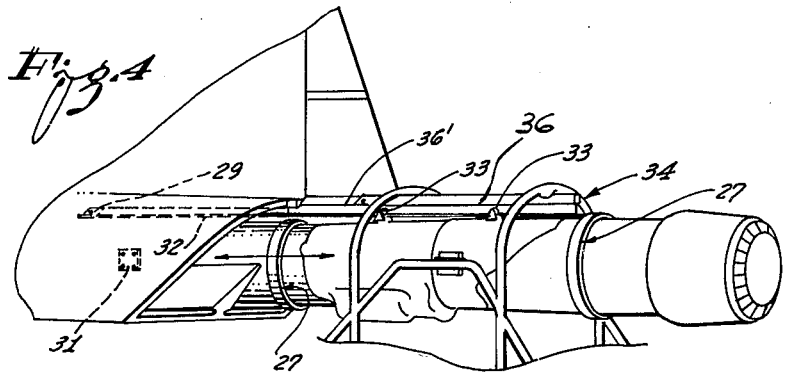
FIGURE 4 is a fragmentary view in perspective of the aft end of the center fuselage section of the aircraft shown in FIGURES 1 and 2, in this figure one engine of the aircraft is shown immediately after removal from the aircraft.

Referring to the drawings, FIGURE 1 shows a jet propelled aircraft 11 incorporating the invention as disclosed herein. The aircraft 11 includes fore, aft and center sections 12, 14 and 16, respectively. The vertical stabilizer 17 is mounted in its entirety on the center section 16, the all movable tail 18 is mounted in its entirety on the aft section 14. In other words the stabilizer 17 remains with the center section 16 and the tail 18 with the aft section 14 at such times as the aft and center sections are separated as shown in FIGURE 3.

The aft and center sections 14 and 16, respectively, are joined together along a plane 19, the plane referred to as a reference plane, has a canted relation of approximately twenty-five degrees (25°) with respect to the longitudinal axis L of the aircraft as best seen in FIGURE 2. In this respect the sections 12, 14 and 16 of the aircraft each have individual axis coinciding with the axis L.

The aft and center sections are secured together by attach bolts (not shown) or the like which are accessible through accessible openings (not shown) provided in the aft fuselage section. The aforementioned attach bolts extend through structural members comprising components of the aft and center sections.

Figure 6:
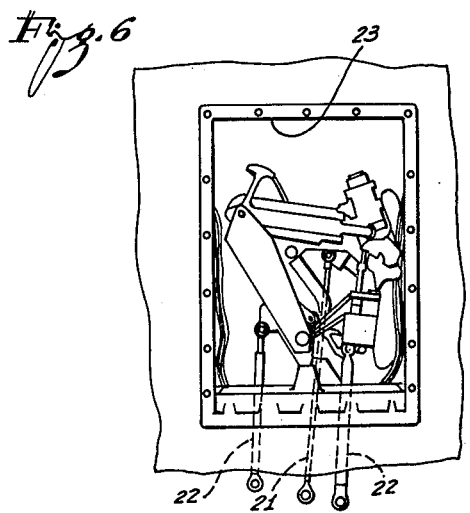
FIGURE 6 is a fragmentary view as indicated by the arrows 6—6 in FIGURE 2.

Prior to releasing the aforementioned attach bolts, the flap rod and tail control rods 21 and 22, respectively, are disconnected through a control mechanism access opening 23 provided in the bottom of the aft fuselage section as best seen in FIGURE 6. The control and tail rods 21 and 22 are the only control member extending between the center and aft sections and function to transmit pilot initiated signals. Miscellaneous electrical and hydraulic means extending between the center and aft fuselage sections include quick disconnect means adjacent the junction of the aft and center sections. These quick disconnect means are accessible through excess opening 23 and other openings (not shown). A trailer 24 having an adapter 26 mounted thereon adapted to receive the aft fuselage section is positioned under the aft section 14, the aft section being secured to the adapter 26.

It will now be apparent that the aforementioned attach bolts may be released and the trailer, adapter and aft section 14 removed from the center section 16 as shown in FIGURE 3. Further, it will be understood that the section 14 may be moved to any desired location and stored at the latter location on the adapter 26.

With the aft section 14 of the fuselage removed from the center section it will be seen that major portions of the aircraft's engine 27 are rendered accessible for repairs etc.

It will also be seen that the canted relation of the plane 19 provides the following advantages; the aft end of the center section 16, canted in the manner as best seen in FIGURE 2, allows the vertical stabilizer 17 to be located a maximum distance aft of the C.G. of the aircraft where it is most effective, also the canted relation provides the advantage just discussed and also renders major portions of the engine 27 accessible. Further, the canted relation allows greater distances between the forementioned attach bolts and therefore provides a joint which—for obvious reasons—is structurally more sound than a joint which is normal to the longitudinal axis L.

Figure 5:
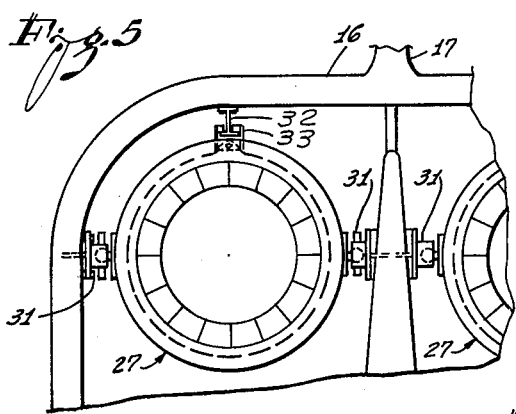
FIGURE 5 is a fragmentary elevational view as indicated by the arrows 5—5 in FIGURE 3.

Referring now to FIGURES 4, 5 and 6, here means securing the engines 27 to fixed structure of the aircraft 11 and also means providing easy removal and replacement of the engine or engines are shown. The securing and removal means of the engines 27 are similar, accordingly the description pertaining to one will apply equally well to the other. The left hand engine is shown in FIGURES 4 and 5 and is secured in the center section 16 of the fuselage by conventional means comprising a forward engine mount 29 secured to fixed structure of the center section and a pair of aft engine mounts 31. Also mounted on overhead fixed structure of the center section and depending therefrom is a track member 32 that is T-shaped in cross-section. Mounted on the engine 27 in spaced longitudinal relation thereon are two sets of rollers 33. As mounted in the center section 16 it will be seen that the rollers of the sets 33 embrace the cross-element of the track member 32. At this time none of the engine's weight is supported by the track member 32, rather all its weight is supported by the aforementioned fore and aft engine mounts 29 and 31, respectively.

To facilitate engine removal and replacement a trailer 24 having an engine installation and removal adapter 34 mounted thereon is utilized. It will be understood that before the trailer 24 and adapter 34 are utilized, in the manner presently explained, the aft section 14 has been removed from the center section 16. It will also be noted that the adapter 34 carries a track member 36 and pivotally mounted extension 36' thereof.

With the aft fuselage section removed, a trailer 24 and adapter 34 are moved into a position in which the latter is adapted to receive the engine 27. In this respect it will be understood that the trailer 24 incorporates means (not shown) whereby lateral, yaw and elevational movements may be imparted thereto. Accordingly the track member 36 is brought into exact alignment with the track member 32 located in the section 16. The track extension 36' is unfolded and its overboard end secured to the aft end of the member 32 by locking means (not shown). It will now be seen that a continuous track member, comprising the components 32, 36 and 36', is provided extending between the center section 16 and adapter 34.

With the track means 32, 36 and 36' aligned as described above the engine is freed of all controls, hydraulic and air lines etc. This function is easily performed due to the fact that the aft section 14 has been removed, other connections not accessible from the aft end of section 16 are rendered accessible through openings (not shown) provided in the skin of the aircraft. The fore and aft engine mounts 29 and 31 are now released and the weight of the engine becomes supported by the track member 32 and roller sets 33.

The engine 27 is now free to be removed from the aircraft 11 by means of rollers 33 cooperating with the track members 32, 36 and 36'. Accordingly the engine 27 is moved to and secured in the adapter 34. With the engine secured in the adapter 34 the track member 36' is disconnected from the track member 32. The trailer, adapter and engine may now be transported to any desired location where it may be stored on the adapter 34. In its stored location the engine 27 may be reconditioned and subsequently replaced or a new engine substituted for the one removed.

Accordingly it will be seen that an aircraft is provided the fuselage of which is constructed in a novel manner rendering major portions of the engine accessible at such time as the aft fuselage section is removed. Also, structure is disclosed enabling the engine or engines to be quickly and easily removed and replaced.

I claim:

1. In a jet powered aircraft the combination comprising: a fuselage embodying a vertical stabilizer and horizontal control surfaces and having a longitudinal axis; said fuselage including fore, aft and center sections each having individual longitudinal axes coinciding with the longitudinal axis of said fuselage; the aft end of said center section and the forward end of the aft section terminating in planes having a canted relation with respect to their respective individual axis; said mating planes, when said center and aft sections are in their assembled relation being located aft of said vertical stabilizer; a turbine type engine mounted in said fuselage with portions thereof positioned in said center and aft sections at such times as the latter sections are assembled; and releasable means securing said aft and center sections whereby major portions of said engine are rendered accessible at such times as said aft section is removed from said center section.

2. In a jet powered aircraft the combination comprising: a fuselage including fore, aft and center sections; a turbine type engine; releasable means securing said engine in said center section; individual overhead track means mounted in said center section; and releasable means securing said aft and center sections together whereby said engine may be removed utilizing said track means at such times as said aft section is removed from said center section and the engine is freed of all connections with said fuselage.

3. In a jet powered aircraft the combination comprising: a fuselage embodying a rudder and movable horizontal control surfaces and having a longitudinal axis said fuselage including fore, aft and center sections each having a longitudinal axis coinciding with the longitudinal axis of said fuselage; the aft end of said center section and the forward end of the aft section being joined along a common plane having a canted relation with respect to the longitudinal axis of said aircraft when said center and aft sections are assembled; a turbine type engine mounted in said center section with portions thereof positioned in said aft section; single track means mounted above said engine in said center section; the upper end portion of said common plane being located aft of said rudder; said rudder being mounted in its entirety on said center section; said horizontal control surfaces being mounted in their entirety on said aft section; and releasable means securing said aft section to said center section whereby major portions of said engine are rendered accessible at such times as said aft section is removed from said center section and said engine being removable from said center section utilizing said track means at such times as said engine is free of all connections with the fuselage of said aircraft.

References Cited by the Examiner

UNITED STATES PATENTS

| | | | |
|---|---|---|---|
| 2,504,422 | 4/50 | Johnson et al. | 244—74 |
| 2,783,003 | 2/57 | Ralston et al. | 244—54 |
| 2,944,766 | 7/60 | Freeding et al | 244—54 |

ANDREW H. FARRELL, *Examiner.*

MILTON BUCHLER, *Primary Examiner.*